US006363958B1

(12) United States Patent
Ollivier

(10) Patent No.: US 6,363,958 B1
(45) Date of Patent: Apr. 2, 2002

(54) FLOW CONTROL OF PROCESS GAS IN SEMICONDUCTOR MANUFACTURING

(75) Inventor: Louis A. Ollivier, Palo Alto, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 09/535,750

(22) Filed: Mar. 27, 2000

Related U.S. Application Data

(60) Provisional application No. 60/133,295, filed on May 10, 1999.

(51) Int. Cl.$^7$ ................................................ G05D 7/06
(52) U.S. Cl. ........................ 137/2; 137/486; 137/487.5
(58) Field of Search ........................ 137/487.5, 2, 486

(56) References Cited

U.S. PATENT DOCUMENTS

| 975,838 A | 11/1910 | Derby |
| 1,620,322 A | 3/1927 | Browne |
| 2,545,787 A | 3/1951 | Leach |
| 3,279,495 A | 10/1966 | Taylor |
| 4,257,450 A | 3/1981 | Ollivier |
| 4,285,245 A | 8/1981 | Kennedy |
| 4,744,387 A | 5/1988 | Otteman |
| 4,828,219 A | 5/1989 | Ohmi et al. |
| 5,062,446 A | * 11/1991 | Anderson .................... 137/468 |
| 5,230,359 A | 7/1993 | Ollivier |
| 5,394,755 A | * 3/1995 | Sudo et al. ..................... 73/861 |
| 5,421,365 A | * 6/1995 | Matsuo et al. .............. 137/599 |
| 5,458,001 A | 10/1995 | Ollivier |
| 5,732,736 A | 3/1998 | Ollivier |
| 5,744,695 A | * 4/1998 | Forbes ........................ 73/1.35 |
| 5,755,428 A | 5/1998 | Ollivier |
| 5,762,086 A | 6/1998 | Ollivier |
| 5,787,925 A | 8/1998 | Ollivier |
| 5,865,205 A | * 2/1999 | Wilmer ......................... 137/2 |

FOREIGN PATENT DOCUMENTS

JP 8-2735 1/1996

* cited by examiner

Primary Examiner—A. Michael Chambers
(74) Attorney, Agent, or Firm—Antonelli, Terry, Stout & Kraus, LLP

(57) ABSTRACT

A flow control system and method for controlling batchwise delivery of process gas for semiconductor manufacturing are disclosed, wherein the flow control system is operable in a flow mode for delivery of a batch of process gas in a delivery period of time and, alternately, in a no-flow mode. After the start of the delivering, the pressure drop of the gas in a reference capacity of the system is measured for a measurement period of time while interrupting the flow of process gas from a source of the process gas to the reference capacity and continuing to deliver process gas from the system to a semiconductor manufacturing apparatus at a controlled flow rate. The rate of pressure drop in the reference capacity during the measurement period of time is used as a measure of the actual flow rate. Where the actual flow rate does not agree with a specified flow rate for delivering, the controlled flow rate for a subsequent delivery period of time in which another batch of process gas is delivered, is adjusted. Components of the flow control system are arranged along a gas manifold in the form of an elongated delivery stick having a width of less than 1.5 inches, saving important space in a group of the flow control systems that may comprise up to 20 units.

17 Claims, 10 Drawing Sheets

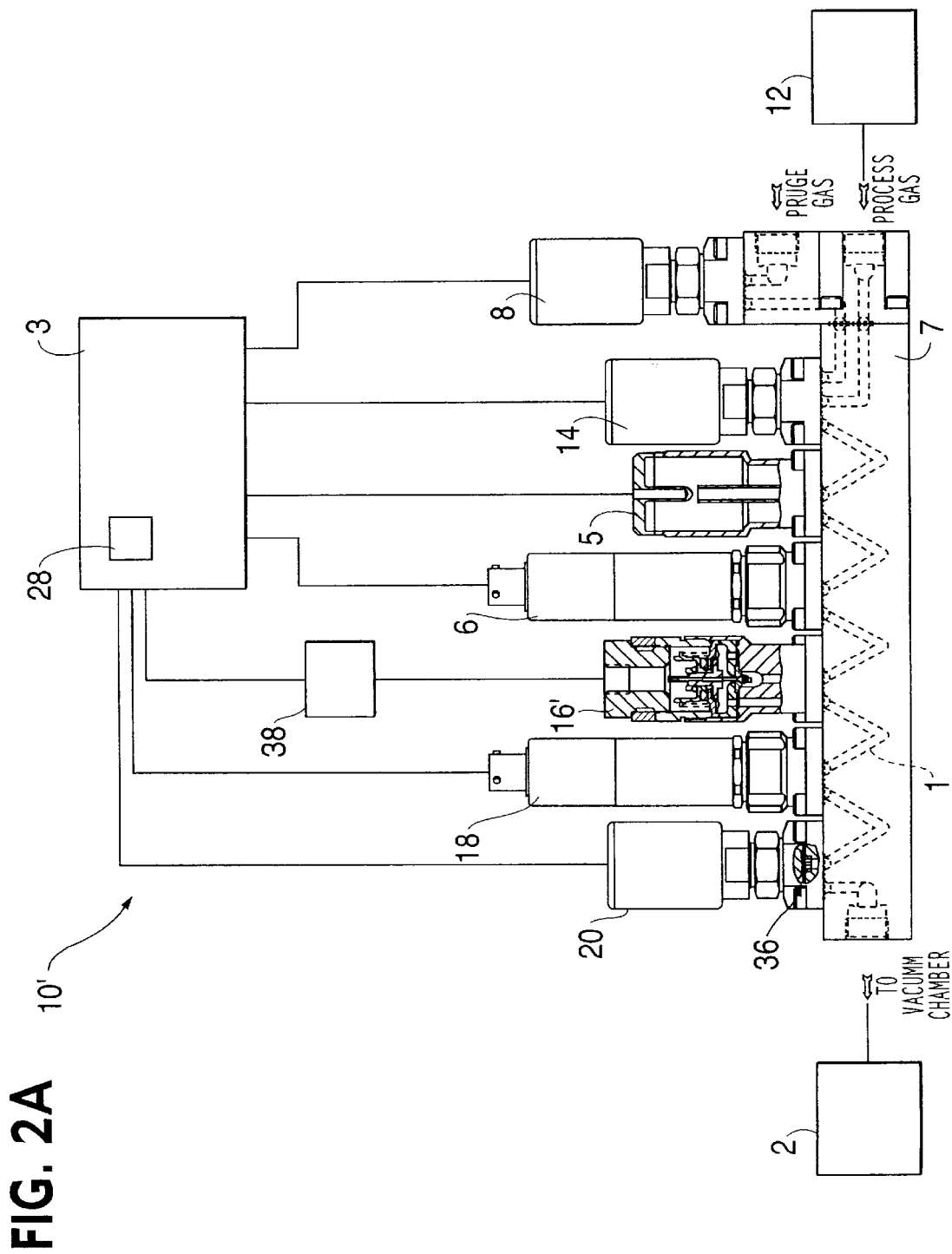

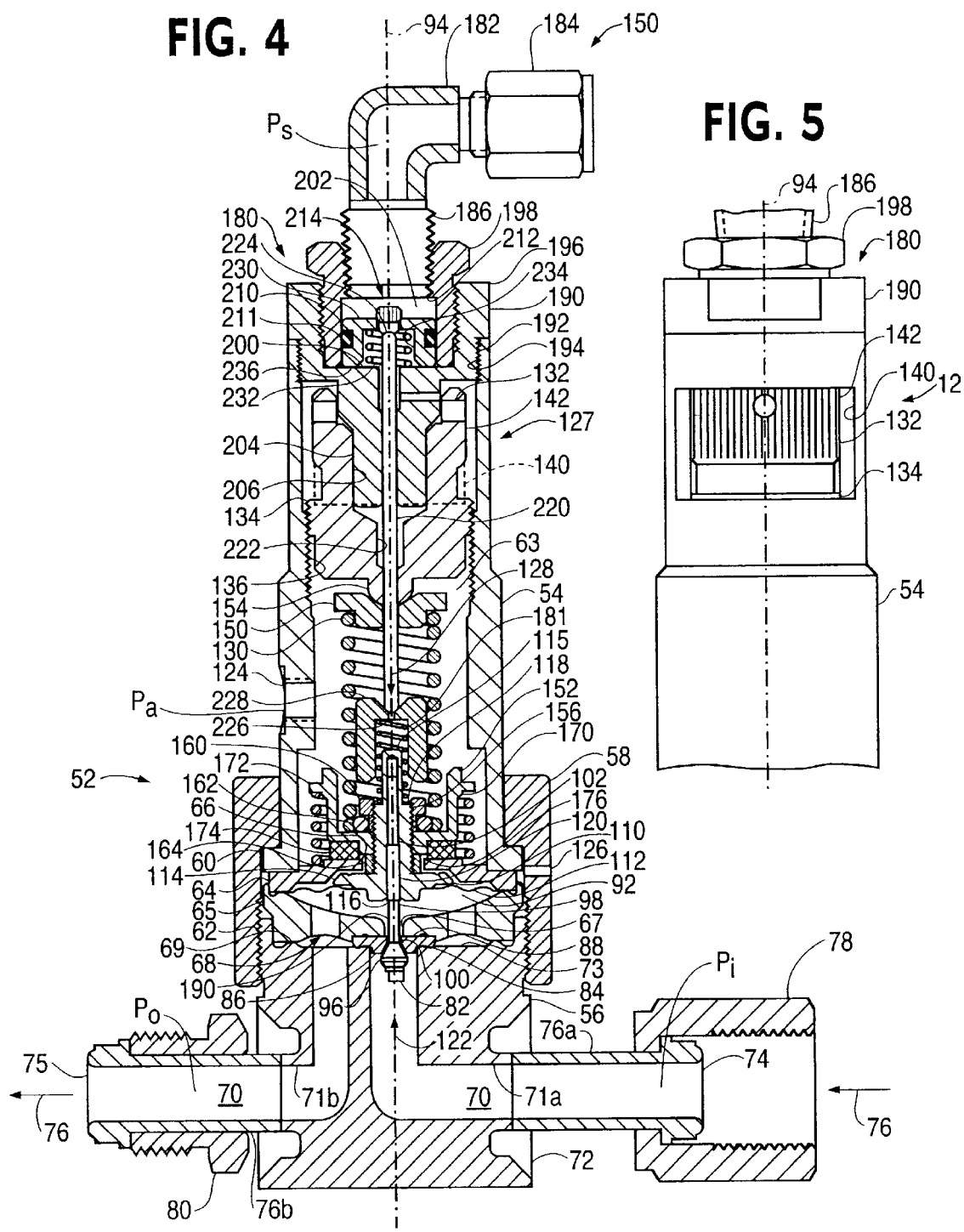

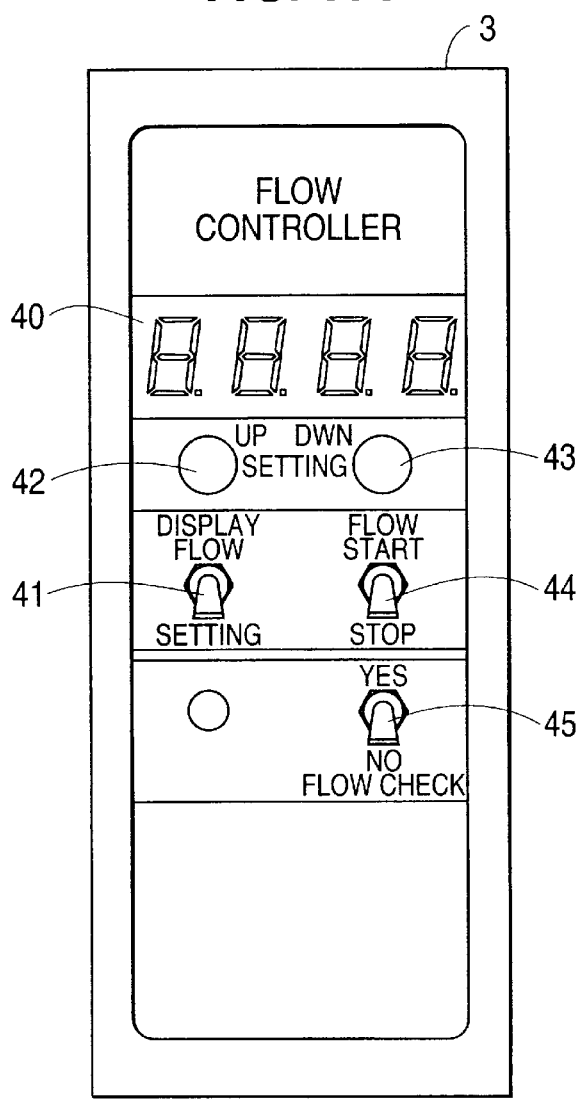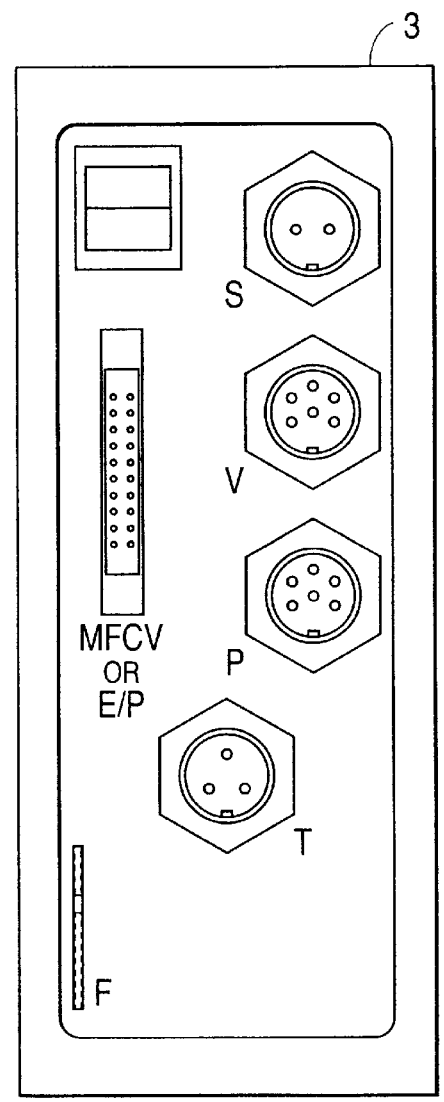

FLOW CONTROL OF PROCESS GAS IN SEMICONDUCTOR MANUFACTURING

RELATED APPLICATION

Reference is made to commonly owned Provisional Application Ser. No. 60/133,295, filed May 10, 1999, for "Fluid Pressure Regulator with Differential Pressure Setting Control", now U.S. Ser. No. 09/553,161, filed Apr. 19, 2000, the disclosure of which is incorporated by reference.

TECHNICAL FIELD

The present invention relates to a flow control system and method for controlling the batchwise delivery of process gas to a semiconductor manufacturing tool. Functional components of the system are assembled on a gas manifold in the form of a narrow delivery "stick".

BACKGROUND

The semiconductor manufacturing process includes a phase in which the process gas is delivered to the tool according to a program that specifies a flow for a period of time. The flow rate is established by a mass flow controller, which is supplied with process gas at a regulated pressure. The output of the mass flow controller is delivered to the manufacturing tool through a pneumatically operated on/off shut-off valve. The delivery is started by actuating the shut-off valve to open and energizing the mass flow controller to deliver a flow at a preset value. The delivery is stopped by actuating the shut-off valve to close and de-energizing the set point of the mass flow controller.

An important consideration is the accuracy with which the flow is delivered during the process phase. To that effect, it is recommended to set the mass flow controller at a value between 40 and 100% of its full scale. In other words, a given mass flow controller has a rangeability of 2.5 to 1. Also, the mass flow controller must be calibrated for the specific gas to which it is applied. This means that in order to cover a range of flows from 5 to 1000 standard cubic centimeters per minute (sccm), as many as six mass flow controllers for any given gas may be required. The accuracy consideration also requires that the mass flow controller retain its calibration for some period of time, preferably as long as possible.

A dynamic gas flow controller is disclosed in U.S. Pat. No. 5,865,205 to Wilmer, for controlling the delivery of a gas from a reservoir to a semiconductor process chamber. The method and apparatus disclosed therein involve determining an initial mass of the gas residing within the reservoir prior to a delivery operation and the final mass of gas residing in the reservoir when the flow of gas to the process chamber is terminated. The initial mass and final mass of gas values are compared to determine the actual mass of gas released from the reservoir during the recipe step. This value serves as an input to a calibration servo loop to update the system calibration constant for a subsequent gas delivery recipe step. The execution of the calibration servo loop serves as a continuous self calibration of a dynamic servo loop, wherein the flow of gas to the process chamber is metered by a variable flow valve upstream of an orifice. The gas pressure created ahead of the orifice during delivery is sensed to measure the gas flow rate.

In the patent to Wilmer, the concept of flow control applies to a gas flowing out of a reservoir instead of a gas flowing in a line. The control signal which operates the variable flow valve is determined by a circuit in which an input signal (representing the desired flow) is integrated over the duration of the delivery step to define the desired volume/mass. The desired volume is compared to the actual volume taken out of the reservoir. A control signal is generated as a function of that comparison and applied as a set point to the control circuit. In the dynamic control circuit, the set point is compared to the pressure signal sensing the flow and a control signal is applied to the variable flow valve to create the desired pressure/flow. That is, in Wilmer, the flow signal is integrated over time and compared to the actual volume. The control signal is applied to the flow control, which consists of the variable flow valve creating a pressure ahead of the orifice.

The patent to Kennedy, U.S. Pat. No. 4,285,245, discloses a method and apparatus for measuring and controlling volumetric flow rate of gases in a line. The patent is of interest for its disclosure of a method of determining the flow rate of gas flowing in a line by imposing a uniform flow rate at a point downstream of a flow measurement chamber in the line, restricting temporarily the flow at a point upstream of the chamber and measuring the pressure decrease in the chamber between the upstream and the downstream points during part of the duration of the restricted flow, the rate of the pressure decrease being substantially proportional to the volumetric flow rate. The patent to Kennedy does not relate to the batchwise delivery of process gas for semiconductor manufacturing or a flow control system therefor operable in a flow mode for the accurate delivery of a batch of process gas and, alternately, in a no-flow mode.

There is a need for an improved method and flow control system for controlling the batchwise delivery of process gas for semiconductor manufacturing, which can complement a conventional delivery stick by the addition of only a few components, and which will allow verification of the accuracy of the flow delivered in an active phase. There is also a need for an improved method and flow control system for controlling the batchwise delivery of process gas for semiconductor manufacturing which increase the effective range of the mass flow controller, ensure long-term stability of the calibration and eliminate the need to pre-calibrate for specific gases.

SUMMARY

The method of the invention for controlling the batchwise delivery of process gas for semiconductor manufacturing using a flow control system of the invention operable in a flow mode for delivery of a batch of process gas and, alternately, in a no-flow mode, comprises delivering a batch of process gas from a source of pressurized process gas through a flow line of the flow control system to a semiconductor manufacturing apparatus at a controlled flow rate for a delivery period of time. The line of the flow control system includes a pressure regulator for establishing a regulated pressure of the process gas in the line, an on/off valve downstream of the pressure regulator to start and stop the flow mode during which the process gas is delivered to the apparatus for the delivery period of time and, upstream in the line from the pressure regulator, a reference capacity used to measure the actual flow rate of the delivery.

The method further comprises, after the start of the delivering of the batch of process gas, measuring for a measurement period of time the pressure drop of the process gas in the reference capacity while interrupting the flow of process gas through the line to the referenced capacity and continuing to deliver process gas from the line of the flow control system to the semiconductor manufacturing apparatus at the controlled flow rate. The rate of pressure drop in the reference capacity during the measurement period and the actual flow rate of the batch of process gas being delivered are determined from the measuring. In case the actual flow rate does not agree with a specified flow rate for the delivering, the controlled flow rate is adjusted in the direction of the specified flow rate from the actual flow rate for a subsequent delivery period of time in which another batch of process gas is delivered.

A flow control system according to the invention is for use within a fluid circuit having a source of pressurized gas to be delivered batchwise at a controlled flow rate to a destination by the flow control system. The flow control system is operable in a flow mode for delivering a batch of gas and, alternately, in a no-flow mode. The flow control system comprises a flow line through which gas from the source of pressurized gas can be delivered, a pressure regulator in the flow line to establish a regulated gas pressure in the line, an on/off valve in the line downstream of the pressure regulator to start and stop the flow mode during which the gas is delivered for a delivery period of time, a reference capacity in the flow line upstream of the pressure regulator for use in measuring the actual flow rate of gas being delivered by the flow control system, a pressure sensor to measure a pressure drop of the gas in the reference capacity during a measurement period of time commencing after the start of a delivery period of time, means in the line upstream of the reference capacity for interrupting the flow of the gas from the source of pressurized gas to the reference capacity during delivery of the gas by the flow control system, and a controller for determining from the measured pressure drop the rate of pressure drop in the reference capacity during the measurement period the actual flow rate of a batch of process gas being delivered and, in case the actual flow rate does not agree with a specified flow rate for the delivering, adjusting the controlled flow rate in the direction of the specified flow rate from the actual flow rate for a subsequent delivery period of time in which another batch of process gas is delivered.

In one embodiment of the invention, the flow control arrangement of the system comprises a mass flow control valve in the line downstream of the pressure regulator. The controller of the system adjusts a set point value of the mass flow control valve for adjusting the controlled flow rate. Advantageously, the mass flow control valve has a range of possible controlled flow rate settings which extends to 100% of its full scale with an effective rangeability of 10:1.

According to another form of the invention, the flow control arrangement of the system comprises a fixed orifice in the flow line downstream of the pressure regulator. The pressure regulator has an adjustable pressure setting for adjusting the controlled flow rate.

The flow control system of the invention uses functional components compatible with a 1⅛ inch width manifold. The assembly features surface mounting on a modular base. A significant benefit is to reduce the length of the delivery stick and to make it possible to place the parallel manifolds side-by-side at a distance of 1.2 inches between center lines instead of the current 1.6 inches. In the flow control system employing a mass flow control valve, increasing the effective rangeability of the controller from 2.5 to 1 up to 10 to 1, makes it possible to cover flows from 5 to 1000 sccm with only three ranges: 1000, 200 and 50 sccm. The long term stability of calibration is also ensured through automatic calibration during each active phase and the need to calibrate for each specific gas is eliminated.

These and other features and advantages of the present invention will become more apparent from the following detailed description of several embodiments of the present invention taken with the accompanying drawings.

BRIEF DESCRIPTION OF DRAWINGS

FIG. 2A is a schematic illustration of a flow control system for batchwise delivery of a process gas in semiconductor manufacturing according to a second embodiment of the invention.

FIG. 4 is a cross-sectional view of a diaphragm-type pressure regulator which can be used in the flow control system of the invention, the regulator including a manually adjustable main pressure setting assembly, and a pneumatically controllable differential pressure setting assembly which is actuable to apply a differential force on the regulator diaphragm independent of the main pressure setting force.

FIG. 5 is a magnified view of the regulator of FIG. 4 showing the manual main pressure setting adjustment thereof in enforced detailed.

FIGS. 7A and 7B are front and back views, respectively, of the controller 3 of the flow control systems of FIGS. 1A and 1B and FIGS. 2A and 2B.

DETAILED DESCRIPTION

Figure 1A:
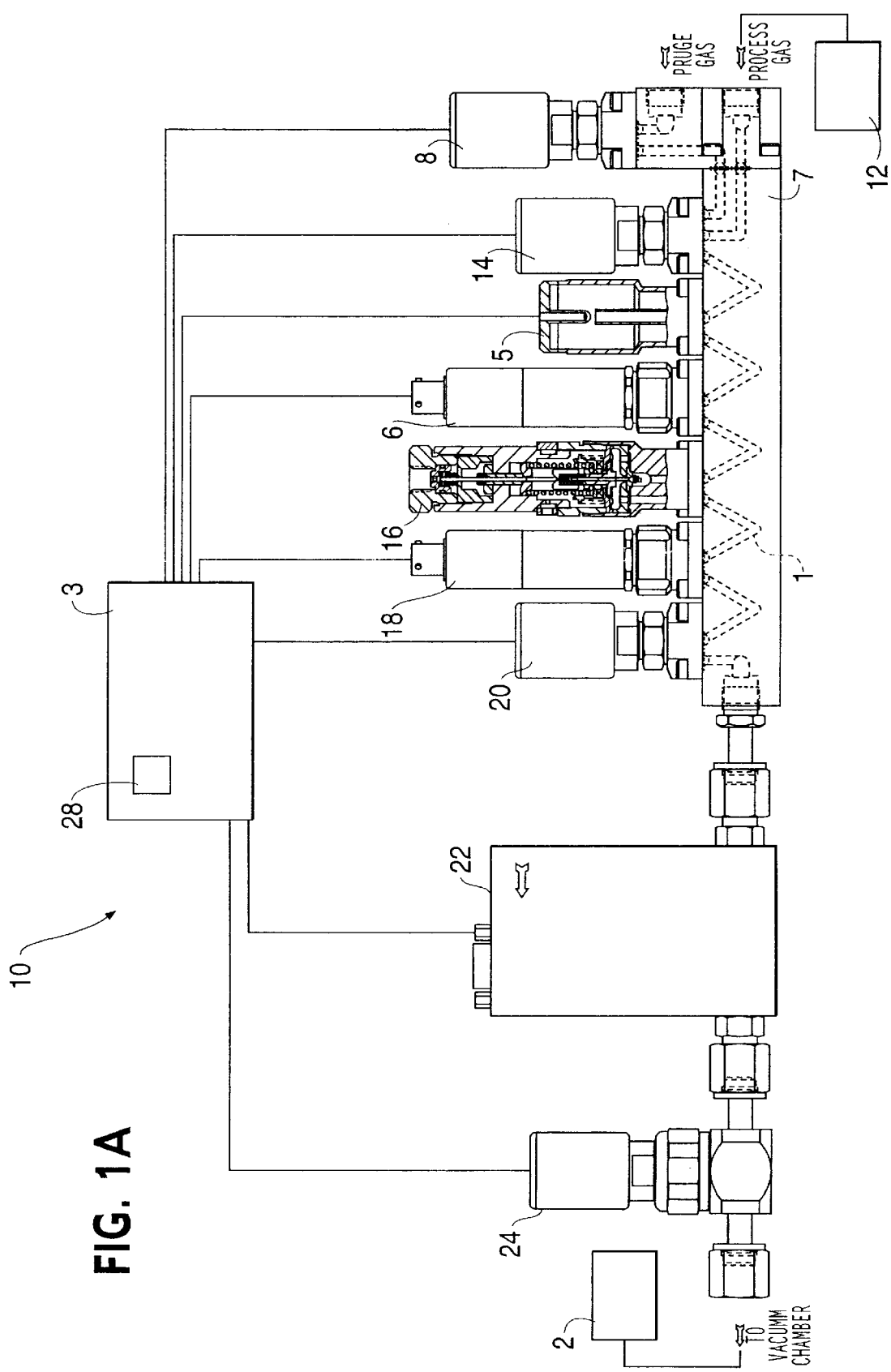
FIG. 1A is a schematic illustration of a flow control system for batchwise delivery of process gas in semiconductor manufacturing according to one embodiment of the invention.

The semiconductor industry utilizes the batchwise delivery of process gases in the manufacture of integrated circuit (IC) chips or dies. In the general mass production of semiconductor devices, hundreds of identical "integrated" circuit (IC) trace patterns are photolithographically imaged over several layers on a single semiconductor wafer which, in turn, is cut into hundreds of identical dies or chips. Within each of the die layers, the circuit traces are deposited from a metallizing process gas such as tungsten hexafluoride ($WF_6$), and are isolated from the next layer by an insulating material deposited from another process gas. The process gases typically are delivered in discrete flow cycles or "batches" from pressurized supplies, thereby requiring delivery systems of a type which may be operated in alternate flow and no-flow modes.

An improved flow control system 10 according to the invention for this purpose is shown in the schematic of FIG. 1. Referring to FIG. 1, the system 10 may be seen to comprise a flow line 1 through which gas from a pressurized process gas supply 12 can be delivered batchwise to a semiconductor manufacturing tool 2. The system 10 is operable in a flow mode for delivering a batch of gas and, alternately, in a no-flow mode, by means of controller 3, for example, a suitably programmed computer.

The flow control system 10 further comprises a pressure regulator 16 in the flow line 1 to establish a regulated gas pressure in the line. An on/off valve 24 in the line 1 downstream of the pressure regulator 16 is actuated by the controller 3 to start and stop the flow mode during which the gas is delivered for a delivery period of time. The valve 24 is a pneumatically operated valve in the disclosed embodiment, see the schematic pneumatic-electrical diagram of FIG. 8.

A reference capacity 5 is provided in the flow line 1 upstream of the pressure regulator 16 for use in measuring the actual flow rate of gas being delivered by the flow control system as discussed below. A pressure sensor 6 in the form of a pressure transducer is located in the line 1 adjacent the reference capacity 5 to measure a pressure drop of the gas in the reference capacity during a measurement period of time commencing after the start of a delivery period of time.

The reference capacity 5 incorporates a temperature sensing element to measure the temperature of the gas inside the capacity. The temperature value is used by the controller, in conjunction with the rate of pressure decrease, to determine the actual flow expressed for standard conditions [14.7 psia and 20° C. (293° K)]. The flow for standard conditions is:

$$Qsccm \; @ \; 20° C. = \frac{V}{14.7} \times \frac{\Delta P}{\Delta t} \times \frac{293}{T}$$

V is the volume of the capacity in cc $\frac{\Delta P}{\Delta t}$ is the rate of pressure change in psi/min T is the temperature in ° K.

A means 14, a pneumatically operated valve in the illustrated embodiment, in the line 1 upstream of the reference capacity 5 can be set in an off position by the controller 3 for interrupting the flow of process gas from the source 12 to the reference capacity 5 during delivery of the gas to the tool 2 by the flow control system.

According to the method of controlling the batchwise delivery of process gas for semiconductor manufacturing using the flow control system 10 of the invention, a batch of process gas is delivered from a source of pressurized process gas through the flow line 1 of the flow control system 10 to the semiconductor manufacturing apparatus 2 at a controlled flow rate for a delivery period of time. After the start of the delivering of the batch of process gas, the pressure drop of the process gas in the reference capacity is measured for a measurement period of time while interrupting the flow of process gas through the line to the reference capacity with the valve 14 and continuing to deliver process gas from the line of the flow control system to the semiconductor manufacturing apparatus 2 at the controlled flow rate.

From the measured pressure drop of the process gas in the reference capacity for the measurement period of time, the rate of pressure drop in the reference capacity and, in turn, the actual flow rate of the batch of process gas being delivered, are determined. In case the actual flow rate does not agree with a specified, desired flow rate for the delivering, the controlled flow rate of delivery by the system is adjusted in the direction of the specified flow rate from the actual flow rate for a subsequent delivery period of time in which another batch of process gas is delivered. In the disclosed embodiment of FIGS. 1A and 1B, this determining and adjusting is performed by controller 3, a programmed computer. The controller 3 adjusts a set point value of the mass flow control valve 22 by a signal sent by the controller for adjusting the controlled flow rate for a subsequent delivery period of time in which another batch of process gas is delivered. For this purpose, the controller 3 includes a reference memory 28 storing a mathematical relationship between the actual flow rate and the flow rate setting of the mass flow control valve for reference in determining the size of the adjusting of the controlled flow rate so that the difference between the two values is reduced to zero in the subsequent delivery period of time.

The flow control system 10 further comprises a gas manifold 7 in the form of an elongated delivery stick having a width less than 1.5 inches. Components of the flow control system are arranged along the gas manifold in communication with the flow line 1 which extends through the manifold and to each of the components mounted on the upper surface of the manifold. Thus, the gas manifold 7 serves as a mounting base for these components. The mounting base has a width of 1.125 inches in the disclosed embodiment. This allows placing a plurality of the flow control systems side-by-side at a distance of 1.20 inches between the parallel center lines, thus saving important space in a group that may comprise up to 20 units. The pneumatically operated valve 8 can be selectively opened to allow a purge gas to be passed through the flow line 1 of the flow control system.

The flow control system 10 to be used in conjunction with a conventional mass flow control valve 22, offers a significant improvement by increasing the effective rangeability of the mass flow control valve from 2.5 to 1 up to 10 to 1, making it possible to cover flows from 5 to 1000 sccm with only three ranges: 1000, 200 and 50 sccm. The flow control system also eliminates the need to calibrate the system for each specific gas and ensures the long term stability of the calibration through automatic recalibration during each delivery phase for the next phase.

The method of controlling the batchwise delivery of process gas for semiconductor manufacturing using the flow control system involves setting the desired flow value as a percent of full scale by setting the desired flow setting of the flow controller 3 for making delivery of process gas. The actual flow during the delivery phase is measured and the command to the mass flow control valve is adjusted so that the actual flow is kept equal to the set point value in the following delivery phase(s). This operation may be repeated at each delivery phase or after a desired number of delivery phases. The actual flow rate determined by measuring the pressure change in the reference capacity 5 is expressed in standard units and applies essentially to any gas. The actual value is compared to the desired set point value. If there is any difference between the two values, the flow control system modifies the command signal sent to the mass flow control valve 22 so that the difference (error signal) is reduced to zero.

Figure 8:
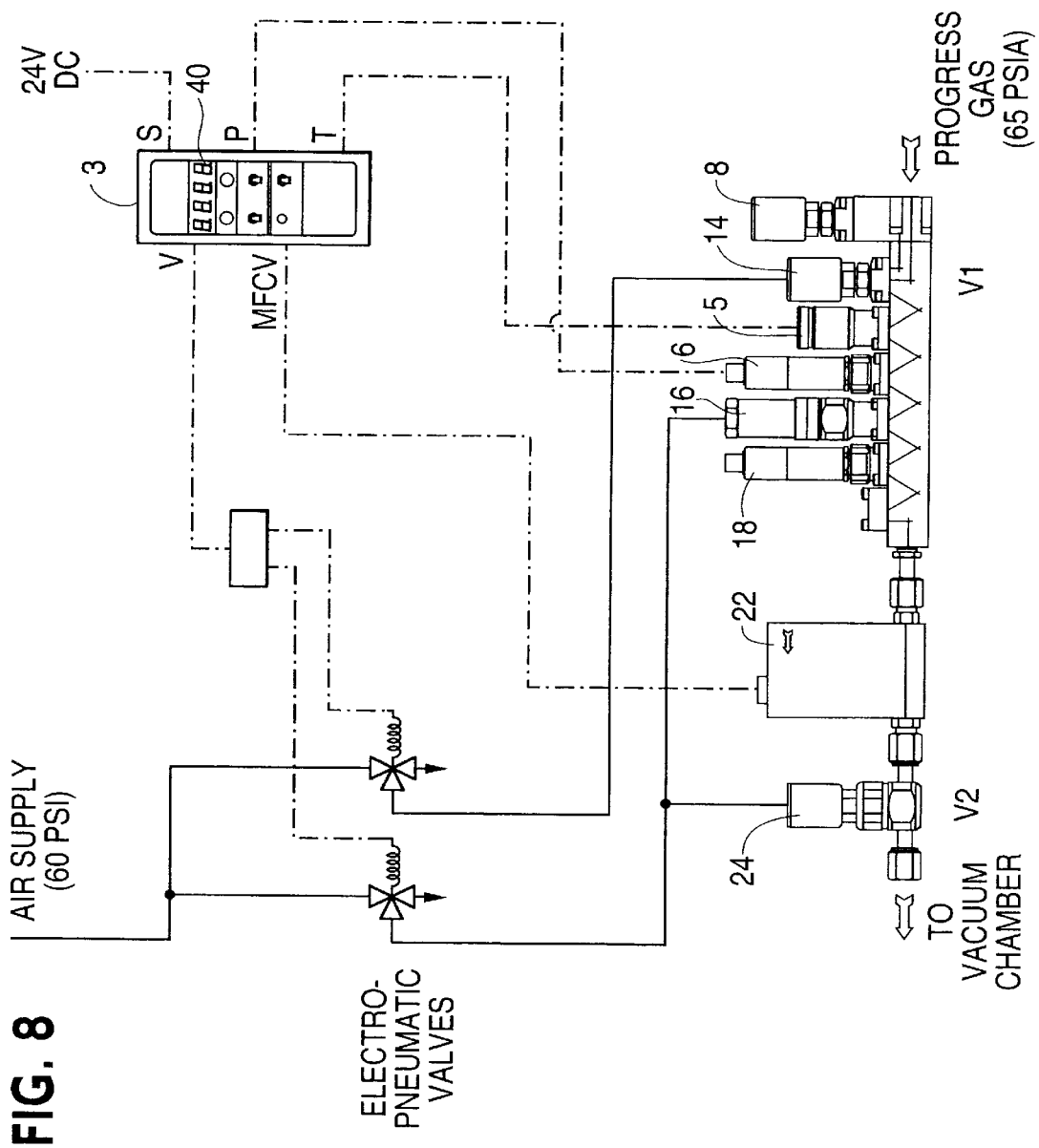
FIG. 8 is an electrical-pneumatic diagram of the flow control system of FIGS. 1A and 1B.

A digital display 40 in FIGS. 7A and 8, on the controller 3 allows the operator to read, alternately, by switching switch 41, the set point flow value and the actual flow value. The set point value may be adjusted by actuating up and down pushbuttons 42 and 43. A second switch 44 allows to start and stop delivery of the process gas. Typically, the pressure regulator 16 is set to supply the mass flow control valve 22 at a regulated pressure of 10–15 psi. The small reference capacity 5 used to measure the actual flow is mounted directly upstream of the pressure regulator. The pressure transducer 6 measures the pressure in the capacity. The pneumatically operated on/off valve 14 is mounted upstream of the capacity. When the valve 14 is open, it supplies the capacity with process gas from the supply line 12 at a typical pressure of 40–50 psi. It is not required to regulate precisely the supply pressure to the system 10. It can be anywhere between 45 and 60 psi, for example.

Prior to the start of a delivery phase, the supply on/off valve 14 is opened and the reference capacity 5 is filled at the supply pressure. The pressure regulator 16 maintains a constant pressure at the inlet of the mass flow control valve 22. At the start of a given delivery operation, which lasts typically from 20–40 seconds, the on/off valve 24 downstream of the mass flow control valve 22 is actuated to open and the mass flow control valve is energized to deliver flow at the set point value. The measurement period begins after the start of the delivery, e.g., 1 second after the start of the delivery. With continued delivery of the process gas, the pressure in the reference capacity 5 decreases progressively. The measurement period continues for a maximum duration of 20 seconds or is terminated when the pressure in the measurement capacity reaches a predetermined value such as 20 psi. At the end of the measurement period, the flow indication displayed at display 40 on the controller 3 is updated to agree with the measured exact value and, if necessary, any correction factor is determined to be applied to the next delivery phase. The change in pressure at the inlet of the pressure regulator, which occurs at the end of the measurement period, does not affect the regulated outlet pressure, which is typically set at 10–15 psi as noted above. Thus, the pressure in the reference capacity 5 is allowed to go from a nominal value of 50 psi down to a limited value of 20 psi. The measurement period will be limited to the maximum of 20 seconds at lower flow values. At higher flow values, the 20 psi limit may occur before the 20 second limit.

At the beginning of the delivery phase, the flow indicator 40 on the controller will display the flow value of the previous delivery. Then it will change to an indication of the current flow when the measurement period is completed. As the measurement period is terminated, the on/off valve 14 at the supply side is actuated to open and the pressure in the reference capacity 5 returns to the supply level. This does not affect the regulated pressure applied to the inlet of the mass flow control valve.

Figure 1B:
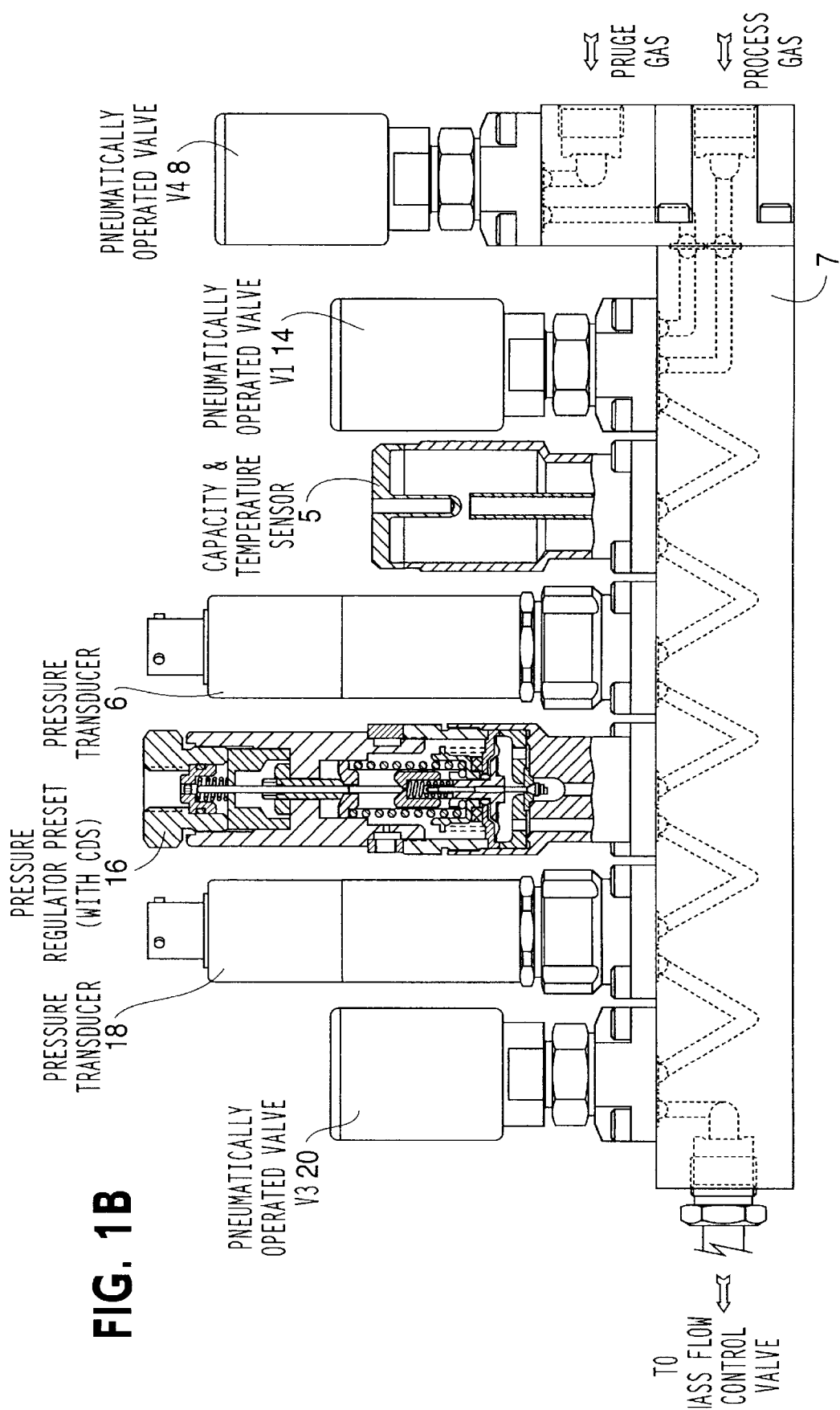
FIG. 1B is an enlarged schematic drawing of a portion of the flow control system of FIG. 1A along a narrow elongated manifold or delivery "stick" of the system having components of the system mounted thereon.
Figure 2B:
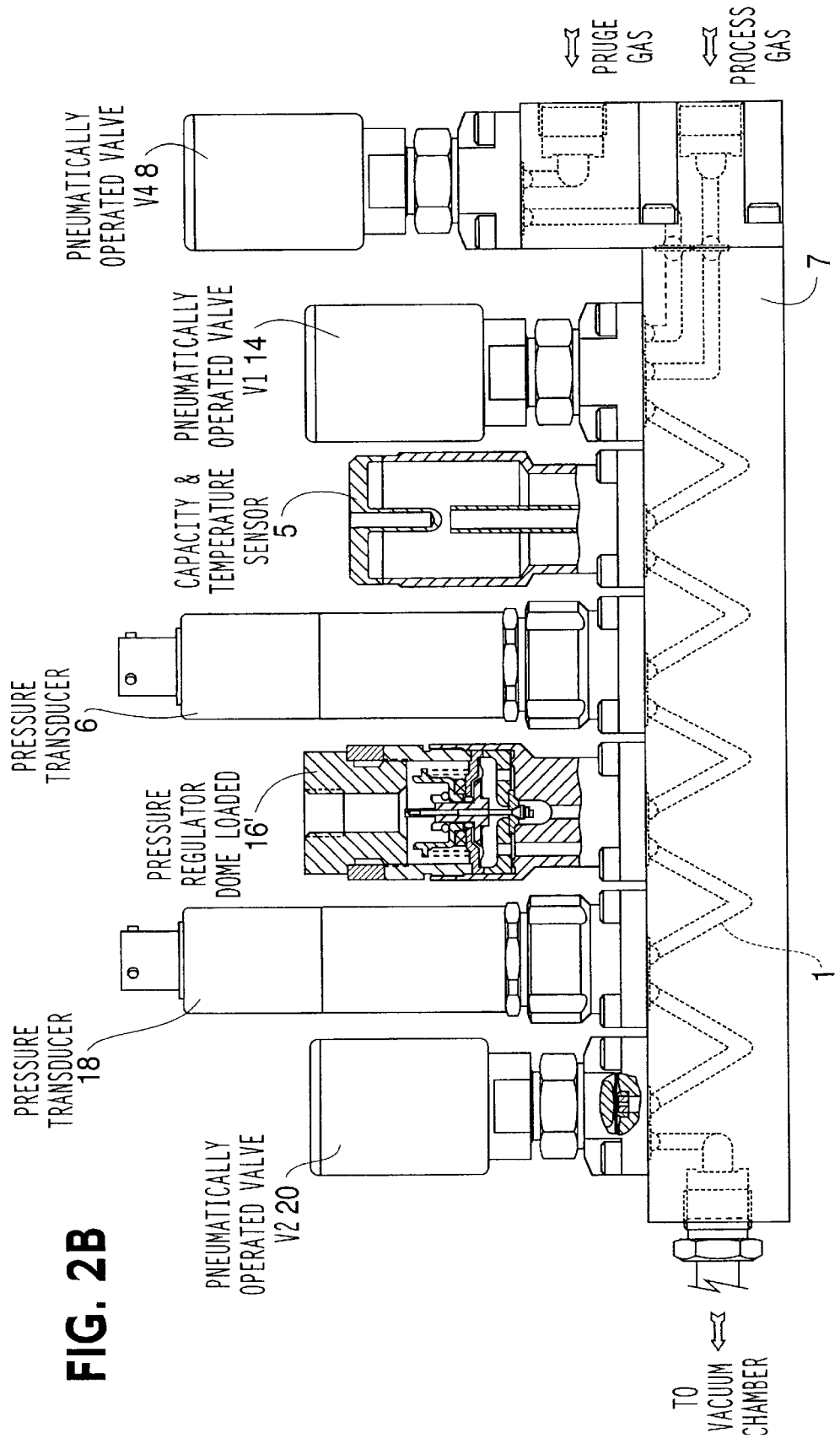
FIG. 2B is an enlarged, schematic drawing of a portion of the flow control system of FIG. 1B along a narrow, elongated manifold or delivery stick supporting components of the system.
Figure 9:
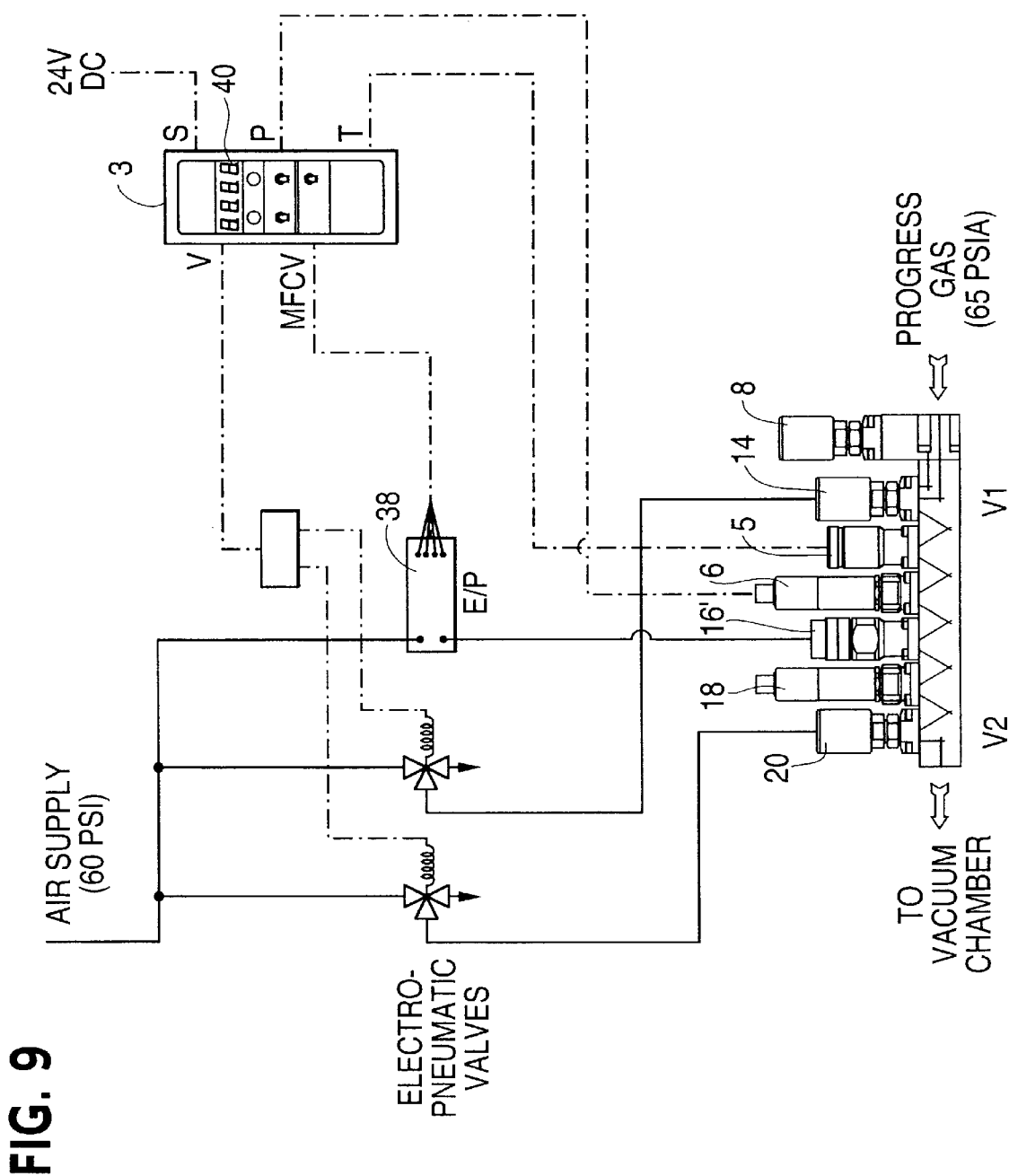
FIG. 9 is an electrical-pneumatic diagram of the flow control system of FIGS. 2A and 2B.

The flow control system 10' in the embodiment of FIGS. 2A and 2B eliminates the need of the mass flow control valve 22 and its attendant shut-off valve. The flow control is provided by a pressure regulator 16' and an orifice 36 incorporated in the seat of on/off valve 20. For a given orifice, the flow is proportional to the absolute pressure applied to it by the pressure regulator 16'. In this application, the set point of the pressure regulator is established by a pressure signal applied to the dome of the pressure regulator. The pressure signal is created by an electric/pneumatic convertor 38, see FIGS. 2A and 9, which generates a pressure proportional to the input voltage from the controller 3 (analogous to the signal applied to the mass flow control valve). Any difference (error signal) between the set point and the measured flow is used to correct the pressure signal applied to the dome of the pressure regulator as in the operation of the flow control system of FIGS. 1A and 1B. At the end of the delivery phase, the on/off valve 20 downstream of the orifice 36 is actuated to close and the pressure signal is removed from the dome of the pressure regulator 16'. This keeps the pressure upstream of the orifice 36 at the set point value and prevents the creep that would normally occur at the outlet of the pressure regulator in a no-flow condition. The given orifice may be used to deliver flow with a rangeability of 10:1, making it possible to cover flows from 5–1000 sccm with only three orifice sizes corresponding to 1000, 200 and 50 sccm.

Figure 3:
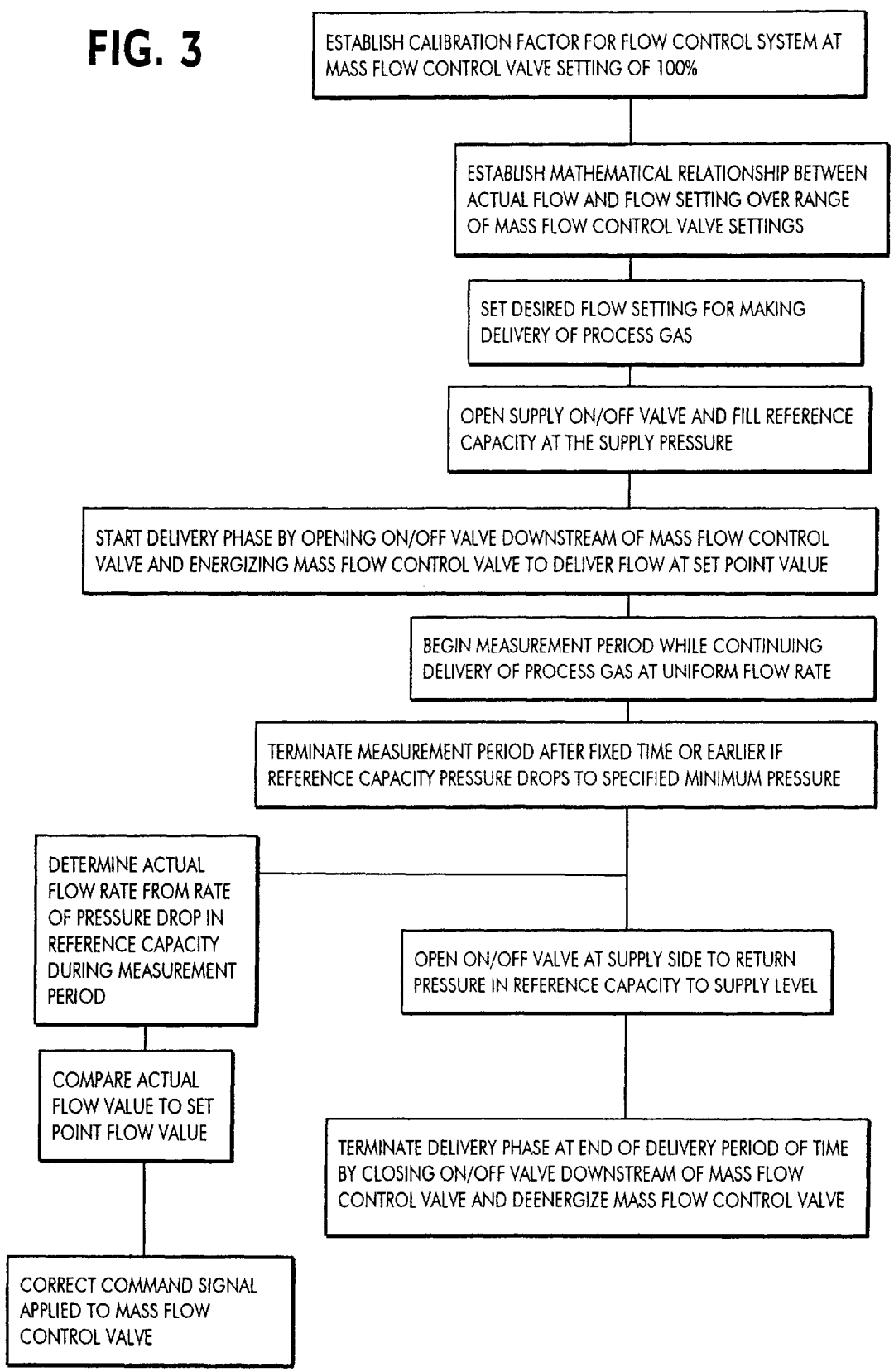
FIG. 3 illustrates a flow chart of one embodiment of the invention.

The operating sequence of a program for a flow control system according to the invention, particularly the flow control system 10 of FIGS. 1A and 1B, is shown in the flow chart of FIG. 3. With reference to a functional demonstration of the control system, it is noted that the mass flow control valve 22 of the system in the disclosed embodiment has a range of 200 sccm. The pressure regulator is set at a nominal 10 psi (25 psia). The nominal volume of the reference capacity is 20 cc. The pressure transducer 6 has a range of 0–100 psia. The supply 12 to the reference capacity 5 is at a nominal value of 50 psi (65 psia). It does not have to be very precise (±2 psi) as indicated above.

A first operation as referred to in FIG. 3 is to establish the calibration factor for the flow control system at mass flow control valve setting of 100%. To accomplish this, the flow check switch 45 on the controller is set to "yes" and a delivery run of process gas is made with the setting of the controller 3 at 100% and the actual flow being delivered is read with a calibrated flow meter. This establishes the relationship between the flow indicated by the digital display 40 (in %) on the controller 3 and the actual flow. The calibration factor is then created in the controller which makes 100% indication correspond to the desired full scale of 200 sccm. Example: the calibration run delivers 220 sccm and the flow indication is 120%. The calibration factor to obtain 100% and 200 sccm will be 100/120×200/220=0.75. With the controller switch 44 at "stop" and the display switch 41 at "setting" so as to display the calibration factor on digital display 40, the new factor is set by using the up and down buttons 42 and 43 on the controller 3. Another delivery run is then made to verify that the flow is 200 sccm and the indication is 100%. The procedure can be repeated if necessary.

The next step in the process is to establish a mathematical relationship between the actual flow and flow setting over the range of the mass flow control valve flow settings. This is obtained by making a delivery run at 100% setting, followed by a delivery run at 10% setting and determining the actual flow (measured by the controller) in each run. That transfer function is established within the controller where it is used to calculate the control signal to be sent to mass flow control valve so that the flow remains equal to the setting. The following sequence creates the calibration runs: set the display switch 41 to "setting" and the flow operation switch 44 to "stop"; push the two buttons 42 and 43 and hold until the calibration factor is displayed; and then set display switch 41 to "flow". This initiates the two successive delivery runs.

The next step is to set a desired flow setting of the flow controller 22 for making a delivery of process gas, for example, 80%. This is done by adjusting with the up and down push buttons 42 and 43 on the controller 3 while the display switch 41 is set to "setting". The flow check switch 45 on the controller is set to "yes". Delivery is started by switching flow switch 44 to "start". The display switch 41 is set to "flow" and the indication of flow is watched on digital display 40 during the delivery. At the end of the measurement period, the flow indication on the display will be updated. The start of the updated value will be flashed briefly (1–2 seconds). The delivery is stopped by switching flow switch 44 to "stop". In the case the flow check switch 45 on the controller 3 were set to "no", the flow indication on the display 40 would remain unchanged for the length of the delivery. This mode of operation may be selected if it is felt that the flow controller 3 needs calibration verification only periodically.

The setting is then changed to 50%, the flow check is set to "yes" and another delivery is started and the flow indication on the display is watched. Initially, the flow indication will be close to 50%. At the end of the measurement period, the actual flow value will be shown. If it is not 50%, a correction will be calculated, to be applied to the next delivery. It may take two or three runs to establish the flow value at 50±0.1%. The setting can then be changed to 20% and the procedure repeated. Likewise, the setting is changed to 10% and the procedure repeated.

A functional demonstration of the flow control 10' of the embodiment of FIGS. 2A and 2B involved the use of an on/off valve 20 which incorporated an orifice 36 having a diameter of 0.004 inch in its seat. This provides a flow of 10 to 150 sccm as the regulated pressure is controlled from 2.5 to 25 psia. To establish a calibration factor, the aforementioned procedure is used to obtain an operating condition of 150 sccm at 100% indication. Next a calibration run is made to establish the transfer function or mathematical relationship. Practice delivery runs can then be made at 80, 50, 20 and 10% as in the previous functional demonstration.

In both functional demonstrations, the flow control system 10' is used to provide a flow setting, read the actual value of the flow delivered, start and stop a delivery phase and select flow verification at each delivery or periodically, as desired. In the ultimate configuration, the functions displayed and incorporated within the flow control system are implemented in the central computer of the machine as will be understood by the skilled artisan from a reading of applicant's disclosure.

According to a further feature of the present invention, the conventional pressure regulators 16 and 16' of the embodiments of FIGS. 1A, 1B and 2A, 2B can be replaced with the pressure regulator 50 shown in FIGS. 4 and 5 for mitigating the effect of pressure creep and, when the flow control systems are operated in the alternate flow and no-flow modes, allowing faster pressure response and steady-state operation for improved process gas utilization or other system economy. This pressure regulator is disclosed in commonly owned Provisional Application Ser. No. 60/133, 295, filed May 10, 1999, now U.S. Ser. No. 09/553,161, filed April 19, 2000.

In basic construction, the regulator 50 includes a housing, referenced at 52, which may comprise a generally annular, upper cap portion, 54, and a lower body portion, 56. An associated nut, 58, may be received over a flanged lower end, 60, of the cap 54 for a threaded connection with an externally-threaded upper end, 62, of body 56. Cap and body portions 54 and 56 thereby may be engaged to define an internal chamber, 63, within housing 52. Upper and lower support plates, 64 and 65, respectively, are clamped between the cap and body portions 54 and 56 for supporting other regulator components. Each of plates 64 and 65 are formed as having a central opening, 66 and 67, respectively. Plate 65 further is formed as having a plurality of axially-extending through bores or channels, one of which is referenced at 68, and is made to compressively engage a raised annular surface, 69, of body 56 to effect a back-up seal against leakage of the gas or other fluid flowing through the regulator 50.

Body portion 56 of housing 52 itself is formed as having an internal fluid passageway, 70, which may be divided into generally L-shaped upstream and downstream portions 71a and 71b, each extending from an axial surface, 72, of body 56, to an upper radial surface, 73, thereof. Fluid passageway 70 itself extends between an inlet, 74, and an outlet, 75, of the regulator for the flow of fluid therethrough in the direction referenced by arrows 76. Within the fluid circuit in the control systems 10 and 10' of FIGS. 1A, 1B and 2A, 2B, a high pressure flow of gas is supplied to regulator inlet 74 from supply 12, and a regulated, lower pressure flow is delivered to mass flow control valve 22 from regulator outlet 75. In this regard, regulator inlet 74 may be coupled in fluid communication with supply 12 via valve 14, with outlet 75 being coupled in fluid communication with mass flow control valve 22 via valve 20. Each of inlet 74 and outlet 75 accordingly may be configured, as is shown, as flanged tubing extensions, 76a–b, respectively, which may be joined to body portion 56. For connection within the fluid system 10, extension 76a is shown as having an associated female fitting connector, 78, with extension 76b being shown as having an associated male connector, 80.

For controlling the flow of fluid through passageway 70, chamber 63 houses a valving assembly including a poppet, 82, and an associated valve seat, 84, defined within passageway 70 such as by a disc which is supported over the upstream portion 71a of passageway 70 and clamped between the central opening 67 of lower support plate 56 and the opening of passageway portion 71a into the upper radial surface 73 body portion 56. Valve seat 84, is oriented relative to the flow direction 76 gas having an upstream side, 86, and a downstream side, 88, and includes an aperture, 90, for admitting fluid pressure into a lower plenum, 92, of chamber 63, which plenum is defined partially by lower support plate 65. Flow out of plenum 92 and into the downstream portion 71b of passageway 70 is accommodated via plate channels 68. The disc for valve seat disc 84 preferably is formed of a plastic or other polymeric material, and most preferably of a fluoropolymer such as Kel-F® (3M, St. Paul, Minn.).

Poppet 82 is movable along a central longitudinal axis, 94, of the regulator 50 between a first position (shown in FIG. 4) closing passageway 70 to fluid flow for the operation of fluid system 10 (FIG. 1A) in its no-flow mode, and a variable second position throttling the fluid flow through passageway 70 for the operation of system 10 in its flow mode. For cooperation with valve seat 84, poppet 82 is provided to extend along axis 94 from a lower head portion, 96, disposed opposite the upstream side 86 of valve seat 84, to an upper, elongate stem portion, 98, which, in turn, extends through aperture 90 and lower plate opening 67 along axis 94 from a lower proximal end, 100, connected to head portion 96, to an upper distal end, 102. Poppet head portion 96 is configured, such as the general conic shape shown, to annularly vary the relative size of aperture 90 and, accordingly, the flow rate through the regulator, when moved toward or away from valve seat 84 in the variable second poppet position.

For controlling the movement of poppet 82 along axis 94, a diaphragm, 110, is received within chamber 63 as disposed in fluid communication with passageway 70 to define a flexible upper wall of plenum 92, and as coupled in force transmitting contact with poppet 82. Diaphragm 110 is of a conventional single or multiple piece construction, and includes a circumferentially extending, generally flexible "membrane" portion 112. Membrane portion 112 extends radially outwardly to an outer margin which defines the outer periphery of the diaphragm 110, and which is clamped between the upper and lower plates 64 and 65 for the mounting of diaphragm 110 within chamber 63. In a two-piece construction of diaphragm 110, membrane portion 110 is welded, bonded or otherwise attached to a backup portion, 114, which supports the membrane portion 112, and which extends axially therefrom through the opening 66 of plate 64 in defining a cylindrical extension, 115, including an internal central passage, 116, and an external shoulder, 118. Passage 116 is configured to receive the distal end 102 of poppet stem 98, and may be internally threaded for engagement with an externally threaded portion, 120, of stem 98. So received in chamber 63, diaphragm 110 is provided to be responsive to a fluid pressure force, which is proportional to the inlet pressure ($P_i$) and outlet fluid pressure ($P_o$) of the fluid flow to regulator 50 and is applied to the direction referenced at 122 to urge poppet 82 toward its first position closing passageway 70 to fluid flow. Atmospheric pressure ($P_a$) is admitted in chamber 63 on the upper side of diaphragm 110 via port 124 through cap 54.

A main pressure setting assembly, reference generally at 127, is actuable to applying a balancing force on diaphragm 110 in the direction referenced at 128 for opposing the fluid pressure force 122 and urging poppet 82 toward its second position opening passageway 70 to fluid flow. Such force 128 is developed at least in part by the adjustable compression of a main coil spring, shown in phantom at 130, or other resilient member received within chamber 63. In the illustrated embodiment of FIG. 4, spring 130 is disposed coaxially with axis 94 for compression intermediate diaphragm 110 and a manually-adjustable knob, 132, which is translatable along axis 94. For a compact design of regulator 50, knob 132 is externally-threaded as at 134, and is housed within cap 54 as threadably rotatably engaged with an internally threaded portion, 136, thereof. As may be seen best with momentary reference to the magnified frontal view of main pressure setting assembly 127 shown in FIG. 5, cap 54 is provided as having a window, 140 (also shown in phantom in FIG. 4), through which a knurled portion, 142, of knob 132 is provided to be hand accessible.

Returning to the cross-sectional view of FIG. 4, spring 130 may be seen to be received within chamber 63 as disposed intermediate an upper retainer, 150, and a lower retainer, 152. Upper spring retainer 150 is generally disc-shaped, and is disposed in abutting, force-transmitting contact with a thrust portion, 154, of knob 132. Lower spring retainer 152 is generally cylindrically-shaped, and is received coaxially over diaphragm back-up extension 115 as threadably engaged in force transmitting contact with an externally threaded portion 156, thereof. Retainer 152 is fastened onto extension 115 with a nut, 160, which may have an associated O-ring 162, over which the lower end of spring 130 may be friction fit for assisting the coaxial alignment of the spring with axis 94. A compression ring, 164, or other spacer may be received with retainer 152 over extension 115 for delimiting the travel of the retainer over the extension.

For applying an additional force on diaphragm 110 in the direction of arrow 122, a wave spring or other compressible member, shown in phantom at 170, is received coaxially over retainer 152. Spring 170 is supported on upper support plate 64 for compression therebetween and a radially-outwardly extending flange portion, 172, of retainer 152. Such compression of spring 170 provides a biasing force for further urging poppet 82 toward its first position such that fluid passageway 70 is normally closed in the absence of a pressure setting force 128. The movement of poppet 82 between its first and second positions may be damped with a compressible foam washer, 174, which is received coaxially over diaphragm extension 115 for compression intermediate retainer 152 and plate 64. The displacement of poppet 82 in its second position by the application of pressure setting force 128 is delimited by the abutting engagement of a lower stop surface, 176, of retainer 152 with plate 64.

Regulator 50 further includes a differential pressure setting assembly, referenced generally at 180. In accordance with the precepts of the present invention, differential pressure setting assembly 180 is provided to be actuable independently of the main pressure setting assembly 127 to apply a differential force, such as via the compression of a second coil spring member, 181, on diaphragm 110 in the direction of arrow 128 further urging poppet 82 toward the second position opening passageway 70 to fluid flow. In the illustrated embodiment of FIG. 4, differential pressure setting assembly 180 is actuable responsive to a pneumatic on/off control signal of a given input pressure ($P_s$) which, preferably, may be between about 50–60 psig to be at the same level which is conventionally employed in operating the pneumatic valves 14 and 24 of fluid system 10 of FIG. 1. The signal to assembly 180, as well as valves 14 and 24 of system 10, may be provided under the common control of, for example, of a pneumatic 3-way valve (not shown).

The pressure control signal may be admitted to regulator 50 via a tubing or other fitting connection, 182, having, for example, a female end, 184, configured for a tubing or other connection to the above mentioned 3-way valve or other control signal source, and male end, 186, configured for a threaded connection with an adapter, 190, of regulator housing 52. Adapter 190, in turn, has a male end, 192, configured for a threaded connection with an internally threaded upper end, 194, of cap 54, and a female end, 196, which, depending upon the sizing of fitting end 186, may be coupled thereto via a bushing or other reducer, 198. The female end 196 of adapter 190 further is configured as having a recess which extends to internal end wall, 200, that defines a second chamber, 202, within housing 52. The adapter male end 192 further is configured as having an elongate guide portion, 204, which is fitted within a generally cylindrical counter bore, 206, of knob 132 to assist in guiding the knob along axis 94.

For controlling the compression of second spring member 181, a piston, 210, having an associated O-ring or other seal or packing ring, 211, is received within chamber 202 as displaceable intermediate lower end wall 200 and an upper end wall, 212, of chamber 202. Upper end wall 212 is defined, such as by a radially-inwardly extending internal shoulder portion of reducer 198, about a common opening, 214, of adapter 190 and reducer 198, which opening 214 functions as a port for the admission of the signal fluid pressure into chamber 202.

Piston 210 is operably coupled to spring 181 via an elongate force transmitting member, 220. Such member 220 extends along axis 94, as received coaxially through a central bore, 222, formed through each of adapter 190, knob 132, and spring retainer 150, from an upper end, 224, disposed in abutting contact with piston 220, to a lower end, 226, disposed in abutting contact with spring 181. Spring 181 itself is disposed coaxially within main pressure setting spring 130 as mounted over diaphragm extension 115 for compression between the shoulder portion 118 thereof, and an inverted U-shaped retainer, 228, interposed between spring 181 and the lower end 226 of elongate member 220.

Within chamber 202, piston 210 is actuable responsive to the control pressure signal as admitted through opening 214 and applied to an upper surface, 230, of the piston. That is, piston 210 is displaceable along axis 94 from a normally-biased upper position to the lower position shown in FIG. 4. For biasing piston in its upper position, a compressible spring coil, 232, may be received within a recess, 234, formed within a lower surface, 236, of the piston for compression against adapter lower end wall 200. In its lower position, piston 210 depresses elongate member 220 which, in turn, effects the compression of spring 181 to apply a differential force, which may be between about 3–4 psig, on a diaphragm 110. In this way, a controlled application of the differential force may be achieved independent of the application of the main pressure setting force.

The force applied by spring 181 is "differential" in that it may be applied as a step function to effect a proportionate change in the regulator outlet pressure without changing the main pressure setting. For example, with the main pressure setting assembly 127 of regulator 50 being adjusted within a range of between about 0–30 psi, differential pressure setting assembly 180 is actuable by the control signal to increase the effective regulator setting by a nominal 3 psi. If desired, the pressure of the control signal may be adjusted to effect a generally proportional increase or decrease in the differential force.

Figure 6:
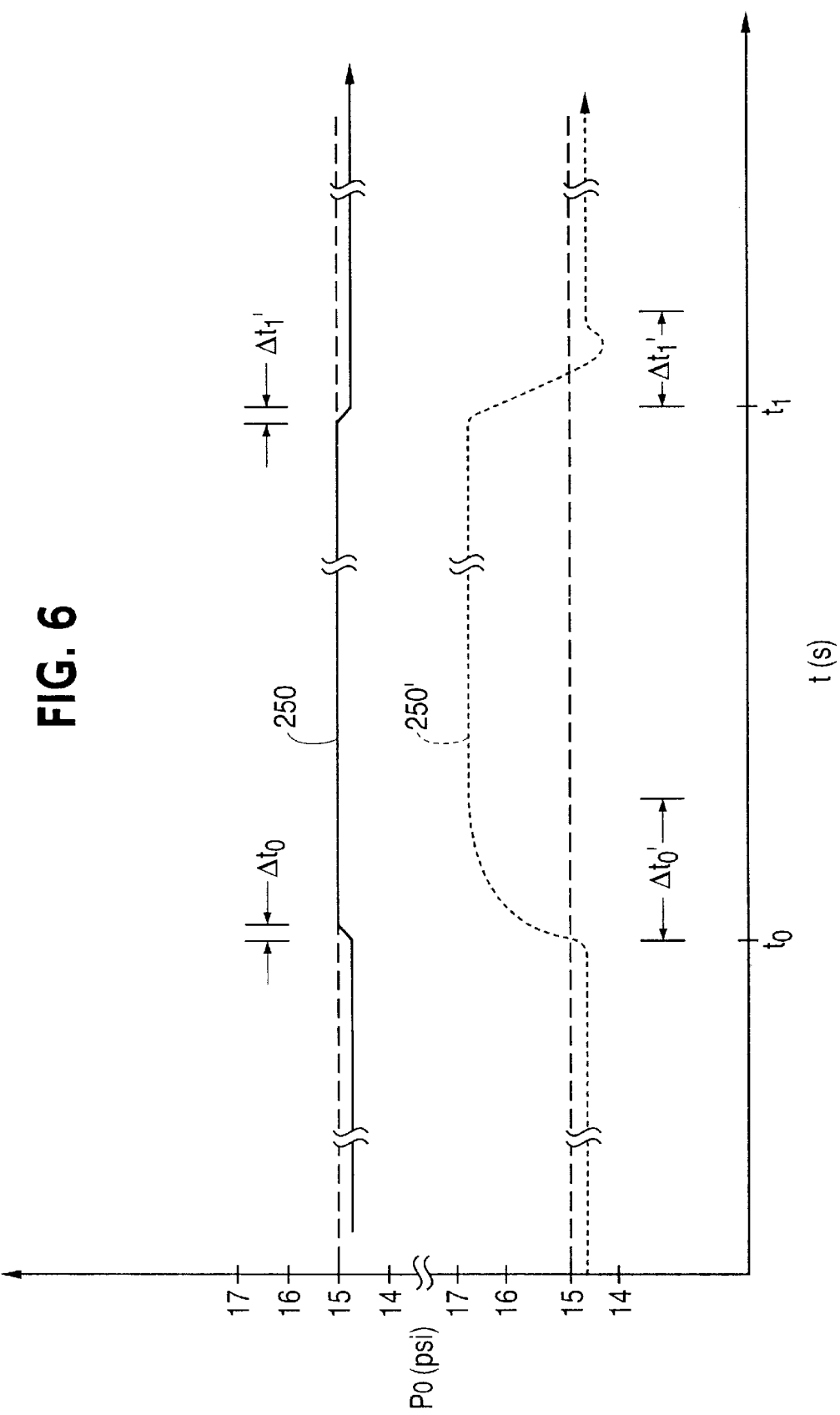
FIG. 6 is a representative pressure response of a the regulator of FIGS. 4 and 5 with a controlled differential pressure setting, the response being shown as the regulator outlet pressure traced as a cyclic function of time and as compared to the response of a regulator which is conventionally operated at a constant pressure.

Considering the next operation of regulator 50 of the invention as employed in the fluid circuit of the batchwise gas delivery circuit 10 of FIG. 1 (with regulator 50 of the invention being substituted therein for regulator 16), reference may be had additionally to FIG. 6 wherein a typically response of regulator 50 within such circuit is graphically portrayed at 250 as plot of outlet pressure ($P_o$) versus time (t). For a given inlet fluid pressure, which may be between about 50–60 psi, and a specified outlet pressure set point of about 15 psi, the system is operated prior to time $t_o$ in a flow mode. In such mode, gas is delivered through regulator 50 at a steady-state flow rate of, for example, 200 sccm and a regulated outlet pressure of about 14.8 psi. Such pressure is effected under the control of the main pressure setting of the regulator 50 which is adjusted to a nominal pressure of 12 psi, and with signal pressure being supplied to the regulator to apply a differential pressure which is normally 3 psi. Both the main and the differential pressure settings may be set at a lower flow rate of, for example, 50 sccm. In this regard, it may be noted that the actual regulator outlet pressure at steady flow is about 0.2 psi less than the set point due to the effect of "droop" as the flow rate is increased from low flow to its steady-state value.

At about time $t_o$, corresponding to the termination of the flow mode, the mass flow control valve 22 (FIG. 1) is commanded "off". Shortly thereafter, i.e., 0.5 sec or less, pneumatic on/off valve 24 is actuated to close such that fluid flow decreases from the steady-state rate to zero. Generally simultaneously with the actuation of valve 24, signal pressure is discontinued to regulator 50 to remove the differential pressure setting. In this regard, the operation of valve 24 and regulator 50 advantageously may be synchronized under the control of a common signal pressure.

With the differential pressure setting being removed, the setting of regulator 50 effective is reduced to 12 psi. Inasmuch as the outlet pressure remains at the operating pressure of 14.8 psi, the regulator closes such that the outlet pressure is maintained substantially at 14.8 psi. Depending upon the length of the no-flow period and/or on the internal, typically about 0.5 sec, between when the no-flow mode is initiated and when the control pressure signal is removed to effect the closing of the regulator, the outlet pressure may increase slightly, to perhaps 15 psi, over the period $\Delta t_o$. It will be appreciated, however, that by virtue of the controlled differential pressure setting, no appreciable creep effect is evident even when the system is operated with very long internals, i.e., 1 hour or more, between the flow modes.

Continuing then along trace 250, at time $t_f$, corresponding to the initiation of the next flow mode, the pressure signal is resumed to open valve 24 and to re-apply the differential force on the regulator. Shortly thereafter, the mass flow control valve 22 is commanded to again control flow. In such operation, flow may be increased from zero to a steady-state value before any appreciable increase in the outlet pressure as a result of creep induced from the effective change in the regulator setting from 12 psi to 15 psi. Thus, as the flow rate increase, the outlet pressure decreases only about 0.2 psi to settle quickly at the operating pressure within a very short period $\Delta t_f$ of about 0.5 sec. or less. Importantly, as no overshoot or other oscillatory effects are observed, the transition from zero to steady-state flow is able to be established within 1 sec or less.

For purposes of comparison, the pressure trace of a regulator conventionally operated at a constant pressure setting of 15 psi is shown at 250'. At time $t_o$ and continuing over the period $\Delta t_o$' which may be 100 sec or more, the outlet pressure of trace 250' may be noticed to increase by about 2 psi from the operating pressure. As compared to the 0.2 psi increase for valve 50 of the invention, such increase is significant, as is the period $\Delta t_f'$ which may be 1.5 sec or more with some overshoot or other oscillatory effects being evident.

Thus, in the disclosed flow control system and method, this unique and efficient fluid pressure regulator construction and method of operation mitigate the effect of pressure creep and, when the flow control systems are operated in alternate flow and no-flow modes, allow faster pressure response and steady-state operation for improved process gas utilization or other system economy.

Unless otherwise specified, materials of construction are to be considered conventional for the uses involved. Such materials generally will be corrosion resistant and otherwise selected for compatibility with the fluid being transferred or for desired mechanical properties.

As it is anticipated that certain changes may be made in the present invention without departing from the precepts herein involved, it is intended that all matter contained in the foregoing description shall be interpreted in an illustrative rather in a limiting sense.

I claim:

1. A method of controlling the batchwise delivery of process gas for semiconductor manufacturing using a flow control system operable in a flow mode for delivery of a batch of process gas and, alternately, in a no-flow mode, said method comprising:

delivering a batch of process gas from a source of pressurized process gas through a flow line of said flow control system to a semiconductor manufacturing apparatus at a controlled flow rate for a delivery period of time, said line of the flow control system including a pressure regulator for establishing a regulated pressure of said process gas in said line, an on/off valve downstream of said pressure regulator to start and stop said flow mode during which said process gas is delivered to said apparatus for said delivery period of time and, upstream in said line from said pressure regulator, a reference capacity used to measure the actual flow rate of said delivering, and upstream in said line from said reference capacity, means for interrupting the flow of gas from the source of pressurized gas to the reference capacity during delivery of the gas by the flow control system, after the start of said delivering of said batch of process gas, measuring for a measurement period of time during said delivery period of time the pressure drop of said process gas in said reference capacity while interrupting the flow of process gas through said line to said reference capacity with the means for interrupting and continuing to deliver said batch of process gas from said line of said flow control system to said semiconductor manufacturing apparatus at said controlled flow rate, determining from said measuring the rate of pressure drop in said reference capacity during said measurement period and the actual flow rate of said batch of process gas being delivered and, in case said actual flow rate does not agree with a specified flow rate for said delivering, adjusting said controlled flow rate in the direction of said specified flow rate from said actual flow rate for a subsequent delivery period of time in which another batch of process gas is delivered.

2. The method according to claim 1, wherein said flow control system further comprises a mass flow control valve downstream of said pressure regulator, and wherein said adjusting of said controlled flow rate includes adjusting a set point value of said mass flow control valve.

3. The method according to claim 1, wherein said flow control system further comprises a fixed orifice in said flow line downstream of said pressure regulator, and wherein said adjusting of said controlled flow rate includes adjusting a pressure setting of said pressure regulator.

4. The method according to claim 3, wherein said pressure regulator is a dome loaded pressure regulator whose pressure setting is established by a fluid pressure applied to the dome of the pressure regulator, and said method including at the end of said delivery period of time removing the pressure signal applied to the dome of the pressure regulator to prevent creep at the outlet of the pressure regulator in a no-flow mode.

5. The method according to claim 1, wherein said flow control system can be adjustably set to establish said controlled flow rate of gas delivery within a range of possible controlled flow rates depending upon the setting of said flow control system, and said method further including establishing a mathematical relationship between the actual flow rate and the flow rate setting of said flow control system and in case said determined actual flow rate of said batch of process gas being delivered does not agree with said specified flow rate for said delivery, referring to said mathematical relationship in determining the size of said adjusting of said controlled flow rate.

6. The method according to claim 5, including storing said mathematical relationship in a reference memory of said control system for said reference thereto.

7. The method according to claim 5, wherein said flow control system includes a mass flow control valve having a range of possible controlled flow rate settings which extends to 100% of its full scale with an effective rangeability of 10:1.

8. The method according to claim 1, wherein said measurement period of time has a duration of less than or equal to 20 seconds.

9. The method according to claim 1, wherein said measurement period of time continues for a predetermined maximum duration or is terminated sooner when the pressure in the measurement capacity reaches a predetermined minimum pressure.

10. The method according to claim 1, further comprising at the end of said measurement period of time ceasing said interrupting of the flow of process gas through said line to said reference capacity to return the pressure in said reference capacity to a pressure level of the process gas supplied from said source of pressurized gas.

11. The method according to claim 1, wherein said pressure regulator has an inlet coupled in fluid communication with said source of pressurized process gas, an outlet, a valve element which is actuable to close said regulator to the flow of process gas and, alternately, to throttle the flow of said process gas through said regulator, said valve element being actuated by a diaphragm coupled in force transmitting communication therewith and disposed in fluid communication with said process gas to be responsive to a fluid pressure force thereof, and said regulator further including an adjustable main pressure setting assembly for applying a select pressure setting force on said diaphragm, and wherein said method further comprises:

adjusting the main pressure setting assembly of said regulator such that the flow of said process gas therefrom is regulated at an outlet pressure which is less than a desired outlet pressure for delivering said process gas at said controlled flow rate;

applying at about the start of said delivery period of time a differential force on said diaphragm independent of said pressure setting force such that the flow of said process gas therefrom in said delivery period of time is regulated at an outlet pressure which is about said desired outlet pressure; and terminating the application of said differential force at about the end of said delivery period of time.

12. The method according to claim 1, including repeating said method to deliver another, discrete batch of process gas for semiconductor manufacturing during a subsequent delivery period of time.

13. The method according to claim 1, wherein said controlled flow rate is maintained uniform at least during said measurement period of time.

14. The method according to claim 1, wherein said controlled flow rate is maintained uniform throughout said delivery period of time.

15. The method according to claim 1, wherein said flow control system is adjustable for delivering process gas at a range of controlled flow rates, and said method further comprising using said actual flow rate to calibrate said flow control system over said range for delivering additional batches of said process gas.

16. The method according to claim 1, further comprising arranging components of said flow control system along a gas manifold in the form of an elongated delivery stick having a width less than 1.5 inches.

17. The method according to claim 1, further comprising measuring the temperature of said process gas being delivered and using the measured temperature to express said actual flow rate determined at standard conditions.

* * * * *